Patented Jan. 12, 1926.

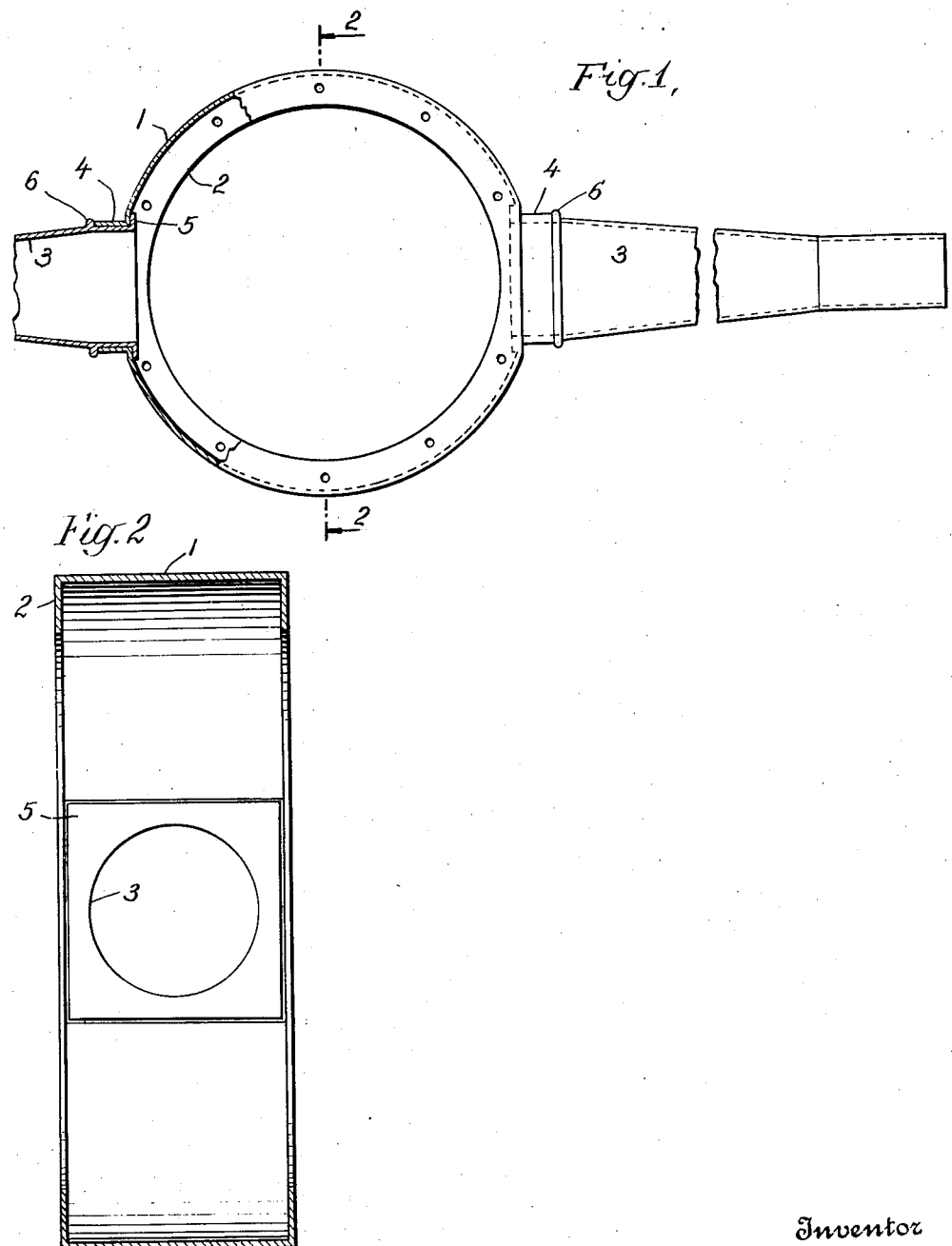

1,569,332

UNITED STATES PATENT OFFICE.

THOMAS E. MURRAY, JR., OF BROOKLYN, NEW YORK.

MANUFACTURE OF HOUSINGS AND THE LIKE.

Application filed October 17, 1921. Serial No. 508,232. REISSUED

*To all whom it may concern:*

Be it known that I, THOMAS E. MURRAY, Jr., a citizen of the United States, residing in the city of Brooklyn, county of Kings, and State of New York, have invented certain new and useful Improvements in the Manufacture of Housings and the like, of which the following is a specification.

The invention aims to provide an improved housing with extensions such as the tubular extensions commonly used for the gearing and rear axles of automobiles, and to provide similar structures and a convenient method of uniting one or more extensions to a gear housing or the like.

The accompanying drawings illustrate embodiments of the invention.

Fig. 1 is partly an elevation and partly a longitudinal section of an automobile rear axle housing;

Fig. 2 is a cross-section of the same on the line 2—2 on an enlarged scale;

Referring to the particular embodiments of the invention illustrated, in order to unite a tube to a gear housing or other part of the structure contemplated, I propose to form a flange upon an intermediate part of the tube by upsetting the latter against the housing or other part contemplated.

Fig. 1 shows a housing comprising an annular wall 1 with inward flanges 2 at its edges designed to receive the cover plates which enclose the gearing. At opposite ends of a diameter the wall 1 of the housing is flattened and provided with openings through which pass tapered tubes 3. The edges of the openings are reinforced by outside annular flanges 4. The tubes 3 have flanges 5 on their inner edges which bear against the inner faces of the wall of the housing when the tubes are inserted through the openings. To fasten each tube in place a flange 6 is formed on the intermediate portion of the same and bears against the outer edge of the flange 4. The flange 6 is formed by upsetting the metal of the tube.

Preferably the flange 5 on the inner end of the tube and the corresponding inner face of the wall of the housing are so shaped as to prevent rotation of the tube on its axis relatively to the housing. For example, as shown in Fig. 2, the flange may have its side edges bearing against the flanges 2 of the housing for this purpose.

It is not essential that the flange 5 be on the very end of the extension. It may be a flange similar to the flange 6, formed on the tube at a point slightly back of the end of the latter so that the tube itself will project slightly into the housing, to provide a longer axle bearing or for some other purpose.

It is possible to form the two flanges on the opposite faces of the wall of the housing in one operation; and it would probably be most convenient to do this where the end of the tube projects into the housing beyond the inside flange. In such an operation an inside mandrel should be used to insure that the tube shall not collapse inwardly. Where the inside flange is formed on the end of the tube as shown in the drawings it is more convenient to form such a flange before inserting the tube into the housing.

Though I have described with great particularity of detail certain specific structures and methods embodying my invention yet it will be understood that the invention is not restricted to the particular structure and methods disclosed. Various modifications thereof in detail may be made by those skilled in the art without departure from the invention as defined in the following claims.

What I claim is—

1. A housing for automobile rear axles comprising an annular wall 1 with inward flanges 2 at its edges and with diametrically opposite openings, the portion of the annular wall surrounding said openings being flattened, tapered tubes 3 having flanges 5 on their inner edges bearing against the inner faces of the wall to prevent outward movement of the tubes and having flanges 6 formed on an outer portion of the tubes to prevent inward movement of the latter through said openings, the flange 5 having side edges bearing against the flanges 2 of the annular wall so as to prevent rotation of the tubes on their axes.

2. The housing of claim 1, the openings in the annular wall being surrounded by outside annular flanges 4 engaged between the flanges 5 and 6 respectively.

In witness whereof, I have hereunto signed my name.

THOMAS E. MURRAY, JR.